(12) United States Patent
Blackwell et al.

(10) Patent No.: US 8,400,795 B2
(45) Date of Patent: Mar. 19, 2013

(54) POWER SHARING METHOD AND SYSTEM FOR TWO-STAGE POWER SUPPLIES

(75) Inventors: Edward L. Blackwell, Rochester, MN (US); Nickolas J. Gruendler, Pflugerville, TX (US); Henry G. McMillan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 12/708,620

(22) Filed: Feb. 19, 2010

(65) Prior Publication Data

US 2011/0205769 A1 Aug. 25, 2011

(51) Int. Cl.
   *H02M 7/00* (2006.01)
(52) U.S. Cl. ........................................... 363/65
(58) Field of Classification Search .................. 323/268, 323/271, 282, 283, 287; 363/65; 307/82
   See application file for complete search history.

(56) References Cited

U.S. PATENT DOCUMENTS

| | | | |
|---|---|---|---|
| 4,729,086 A | 3/1988 | Lethellier | |
| 5,894,413 A * | 4/1999 | Ferguson | 363/65 |
| 6,144,115 A | 11/2000 | Massie et al. | |
| 6,368,064 B1 * | 4/2002 | Bendikas et al. | 417/2 |
| 6,614,133 B2 | 9/2003 | Belson et al. | |
| 6,800,962 B2 | 10/2004 | Bahl et al. | |
| 6,965,219 B2 * | 11/2005 | Brooks et al. | 323/282 |
| 7,157,890 B1 * | 1/2007 | Kris | 323/272 |
| 2004/0003306 A1 * | 1/2004 | Oomori | 713/300 |
| 2006/0044846 A1 * | 3/2006 | Hjort et al. | 363/34 |
| 2008/0164759 A1 * | 7/2008 | Sharma et al. | 307/52 |
| 2009/0167089 A1 * | 7/2009 | Dishman et al. | 307/64 |

OTHER PUBLICATIONS

Wikipedia "Puls-Width Modulatin", http://en.wikipedia.org/wiki/Pulse_width_modulation, Oct. 22, 2009, pp. 1-8.

* cited by examiner

*Primary Examiner* — Adolf Berhane
(74) *Attorney, Agent, or Firm* — Cynthia G. Seal; Jeffrey L. Streets

(57) ABSTRACT

One embodiment of the invention provides a method for optimizing the power consumption in a redundant power system. A pulse width modulation waveform is generated in each of a first and second power supply to control the power output of each power supply. In response to the system load reaching a power setpoint, the first and second power supplies supply power to the system load in parallel. In response to the system load being below the power setpoint, the pulse width modulation waveform is disabled or blocked in the second power supply, and the system load is powered substantially entirely with the first power supply.

17 Claims, 5 Drawing Sheets

POWER SHARING METHOD AND SYSTEM FOR TWO-STAGE POWER SUPPLIES

BACKGROUND

1. Field of the Invention

The present invention relates generally to electronic power supplies, and more specifically to optimizing the operation of redundant power supply systems.

2. Background of the Related Art

A computer system is typically powered by one or more electrical power supplies intended to provide a continuous supply of power. An electronic power supply converts electricity from an electrical power source, such as an alternating current power outlet, to a form usable by a computer system and its various components. For example, a power supply may convert alternating current (AC) to direct current (DC) having a DC voltage specified by the computer system to be powered.

Redundant power supplies are provided in many computer systems to increase reliability of operation. If one power supply fails, another power supply is then available to compensate for the failed power supply. A simple system may, for example, provide "N+N" redundancy, where a number (N) of computer systems are each provided with a number (N) of primary power supplies and a number (N) of redundant power supplies.

A power supply typically has fixed power losses that result in an improved efficiency at higher system loading. When two or more power supplies of a redundant system are operated in parallel to share a system load, the power supplies will be operating at a lower point on their respective efficiency curves. To improve the efficiency of redundant systems, one approach has been to shut down one or more of the redundant power supply units or place them in a standby mode until needed, so that the remaining power supply(ies) operate at a higher efficiency.

BRIEF SUMMARY

One embodiment is a method of providing redundant power to a system load. Alternating current is converted to direct current in each of a first and second power supply. A pulse width modulation waveform is generated to control the power output of each power supply. The direct current from each of the first and second power supplies is supplied to the system load in parallel when the system load is in an upper power consumption range. The output voltage of the first power supply is adjusted higher or the voltage of the second power supply is adjusted lower and the pulse width modulation waveform is disabled or blocked in the second power supply in response to the adjusted output voltage to power the system load entirely with the first power supply when the system load is in a lower power consumption range.

Another embodiment of the invention provides a redundant power system. A first power supply and a second power supply are coupled to a system load in parallel. Each power supply includes a pulse width modulation generator. A power meter is provided for sensing system power consumption. A service processor is provided for monitoring the power consumption and generating a reduced power mode command bit to the second power supply in response to the power consumption being below a power setpoint. A controller is provided for blocking the pulse width modulation waveform in the second power supply in response to the reduced power mode command bit.

DETAILED DESCRIPTION

Figure 1:
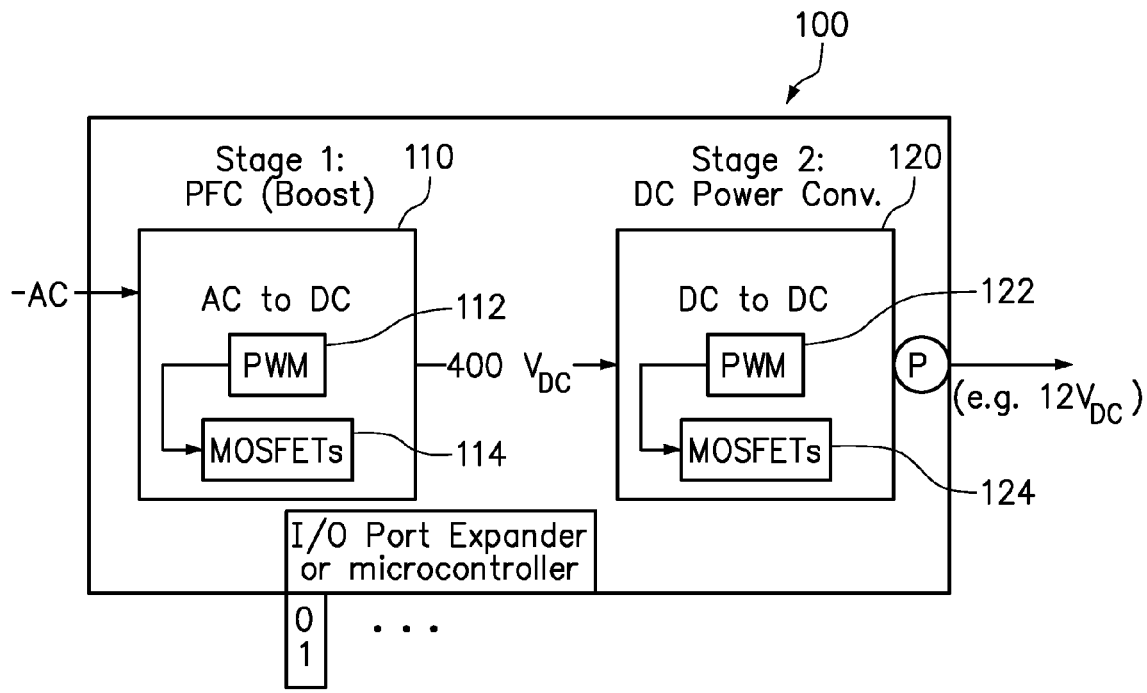
FIG. 1 is a block diagram of a two-stage power supply for use in a redundant power supply system according to an embodiment of the invention.

Embodiments of the invention are directed to redundant power systems and methods wherein efficiency is optimized by selectively sharing power between a primary and secondary (redundant) power supply. Embodiments are discussed primarily in terms of 1+1 redundant systems having one secondary (redundant) power supply for each main (primary) power supply. By analogy, these embodiments can be extended to N+N systems, wherein N is greater than 1. In one embodiment of the invention, power is shared by the primary and secondary power supplies when doing so provides a greater net efficiency than with the primary power supply alone. Likewise, power is supplied by the primary power supply alone when doing so provides a greater net efficiency than with the primary and secondary power supplies together. Whether it is more efficient at any given moment to power a system load with the primary supply alone or the primary and secondary power supplies together is dependent on where each power supply would be operating in its respective efficiency curve for a value of the system load at that moment. One or more power setpoints may be used, according to the efficiency curves, to dynamically control whether to share power between the primary and secondary power supply.

According to one embodiment, a current sharing circuit uses the output voltage adjustment capabilities in a power supply's regulation and feedback mechanisms to control the selective sharing of power between the primary and secondary power supplies. For a power output that would be more efficiently sourced by the primary power supply alone, the current sharing circuit may be used to place the secondary (redundant) power supply into a mode where the secondary power supply is sourcing no current. Control circuitry is provided to modify the voltage feedback mechanism of the primary power supply (discussed in FIG. 4) to adjust the primary power supply to a higher voltage, so that the primary power supply will source all the current. While in this mode of operation, the DC to DC output stage of a secondary power supply will have a lower output voltage and will be reverse biased, and, accordingly, will not be able to provide current to power the system load. Alternatively, the control method can be used to lower the output voltage of the secondary power supply to achieve the same effect.

A variety of control elements may then be used to selectively enable or block the PWM waveform of the secondary power supply. For example, a comparator circuit may be used to disable or block the PWM waveform from the MOSFETs in each of the dc/dc conversion stages of the secondary power supply (and not just modify the duty cycle of the waveform) while the secondary power supply is in a reverse biased mode of operation. However, in another example, a direct signal from a micro-controller could alternatively be used to selectively enable and block the PWM waveform. As a result of blocking the PWM waveform, the secondary power supply will have little, to no, switching losses in this stage of the secondary power supply. A PFC boost stage of the secondary power supply will also be delivering very little power, to maintain the bus voltage (e.g. 400 Vdc), and active switching losses will be low. The PWM will normally be in a burst mode of operation while in this condition. An additional comparator circuit can be used to block or disable the PWM waveforms to the boost MOSFETs. The controls for this comparator circuit allow the PWM waveform to be re-enabled periodically to maintain regulation of, for example, a 300 Vdc intermediate DC bus within the power supply.

A current share signal line will be monitored and a power setpoint set for when to disable the additional voltage adjustment and allow the power supplies to resume normal current sharing operation. When running in the reversed biased mode, the current share line is driven by only the active power supply. The voltage level of the current share line of the active power supply will be higher than when additional power supplies are operating. The control mechanism will be a voltage (hence output current) threshold based on the number of active power supplies. According to this scheme, the power supplies that are not supplying power to a system load are not being turned off or put into a standby mode. If the primary power supply delivering all the current were to fail, the output voltage of the primary power supply would drop. The comparator circuits in the secondary power supply would automatically unblock (re-enable) the PWM waveforms and the secondary power supply would pick up the output current load once the voltage of the primary power supply has dropped down to the slightly lower voltage set point of the secondary power supply.

FIG. 1 is a block diagram of a two-stage power supply 100 for use in a redundant power supply system according to an embodiment of the invention. A first, power factor correction (PFC) "boost" stage is provided by an AC to DC converter 110. The AC to DC converter 110 rectifies an AC input voltage and boosts the rectified AC voltage to a desired DC voltage value, such as in the range of between 380 and 400 Vdc. Boosting the rectified AC voltage to this level achieves a high input power factor, which is a measure of the AC input current being "in phase" with the input AC voltage. A second, DC to DC power conversion stage uses the output (for example, 400 Vdc) from Stage 1 as input, and delivers a specified output voltage(s). Server applications are typically designed with a single power supply output of 12 Vdc, so the DC to DC converter 120 may be, for example, a 400 Vdc to 12 Vdc converter.

There are multiple types of circuitry that can be used to accomplish each conversion stage, all of which are implemented with variations on controlling the duty cycle of turning on and off power MOSFETs (metal oxide semiconductor field effect transistors) through pulse width modulation (PWM). Here, a Stage 1 PWM controller 112 supplies a pulse width modulation waveform to Stage 1 MOSFETs 114 in the process of converting the AC input voltage to the 400 Vdc. A Stage 2 PWM controller 122 supplies a pulse width modulation waveform to Stage 2 MOSFETs 124 in the process of converting the 400 Vdc to the 12 Vdc usable by a server or other system load. The duty cycle of the PWM waveforms may be varied to control the output of each conversion stage, as generally understood in the art apart from their application to the invention.

Figure 2:
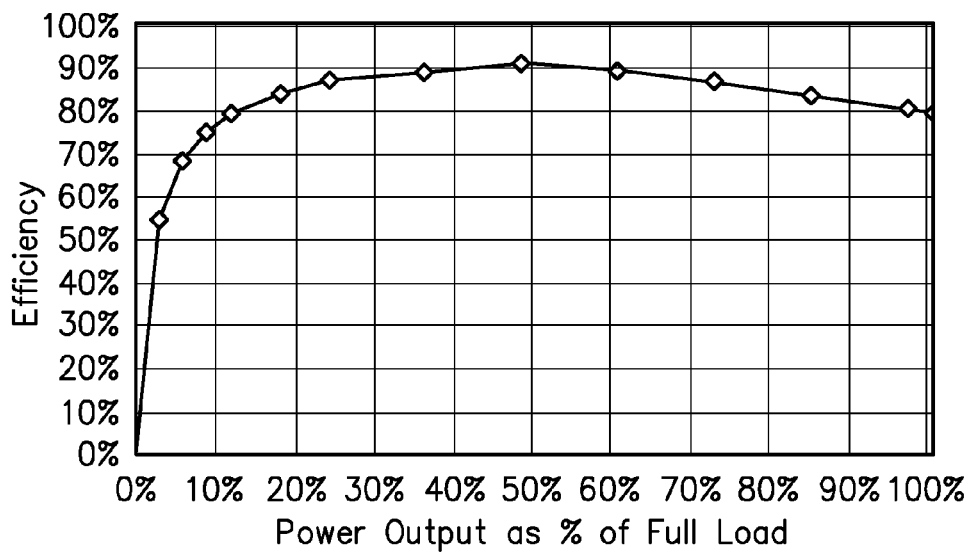
FIG. 2 is an efficiency curve plotting the power conversion efficiency of the power supply versus the percentage of the power supply's maximum power output.

FIG. 2 is an efficiency curve, plotting the power conversion efficiency (vertical axis) of the power supply 100 versus the percentage of the power supply's maximum power output (horizontal axis). Due to fixed losses within the power supply 100, the power supply 100 is more efficient as the power increases above zero (or above the minimum power output of the power supply). For example, the power supply 100 has an efficiency of approximately 75% when operated at 10% of its maximum power, and approaches a maximum efficiency of about 90% at about 50% of its maximum output. The efficiency curve typically drops at power output above 50%. Above this level, the efficiency can be the same or greater by operating two power supplies in parallel. It is therefore more efficient, for example, to operate two identical power supplies, each at 45% of their maximum output, than to operate just one of the power supplies at 90% of its maximum output.

Figure 3:
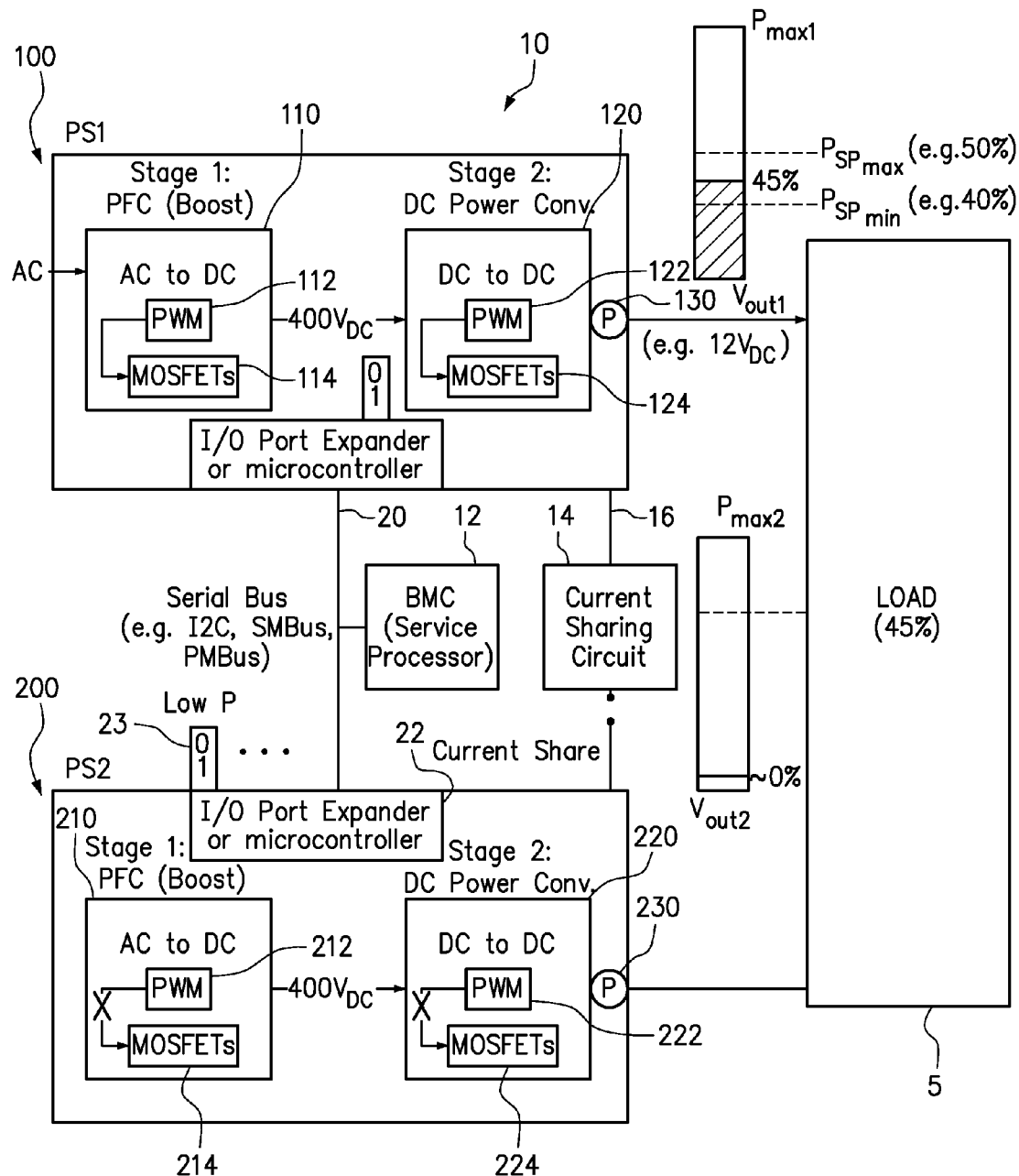
FIG. 3 is a block diagram of a power supply system that incorporates two redundant power supplies connected in parallel to a system load.

FIG. 3 is a block diagram of a redundant power supply system 10 that incorporates two redundant power supplies connected in parallel to a system load 5. The system load 5 represents the load of one or more computer system component to be powered, such as a server. The redundant power supplies are referred to herein as the primary power supply (PS1) 100 and the secondary power supply (PS2) 200. Though only two power supplies are shown here, one skilled in the art will appreciate that the disclosed methods may be applied to redundant systems having more than two power supplies. The power supply 200 is similar or identical to the power supply 100, as discussed in reference to FIG. 1. Accordingly, elements of the power supply 200 are designated with reference numerals of one hundred greater than like elements of the power supply 100.

The system 10 optimizes power consumption according to the efficiency curve of each power supply as illustrated in FIG. 2. Because peak efficiency occurs at 50% of the maximum power consumption of a system load according to the efficiency curve of FIG. 2, an approach to optimizing the efficiency by using one power supply to power system loads in a lower range of, for example, between 0% and 50% of the system load's maximum power consumption and to use both of the power supplies to power system loads in an upper range of, for example, 50% to 100% of the system load's maximum power consumption. Thus, when the amount of power drawn by the system load 5 is less than about 50% of the system load's maximum power consumption, the secondary power supply 200 operates in a reduced power mode, and the primary power supply 100 supplies all of the power to the system load 5. When the system load is greater than about 50% of the system load's maximum power consumption, the secondary power supply 200 is returned to a higher power mode, and the two power supplies 100, 200 supply equal amounts of power to the system load 5. The mechanism by which the secondary power supply 200 is placed in and changed between the higher power mode and reduced power mode is discussed further below.

The secondary power supply 200 may be switched between the higher power mode and the reduced power mode in response to the system load rising above or falling below a setpoint. Hysteresis is optionally incorporated by using two setpoints: one setpoint to trigger switching the secondary power supply 200 from the reduced power mode to the higher power mode and another setpoint to trigger switching the secondary power supply 200 from the higher power mode back to the reduced power mode, to avoid unnecessarily cycling the secondary power supply 200 back and forth between those two modes at system loads fluctuating around 50%. Specifically, an upper setpoint "$P_{SPmax}$" of 50% and a lower setpoint "$P_{SPmin}$" of 40% are used by way of example. The higher power mode of the secondary power supply 200 is enabled when the system load increases to the upper setpoint of 50%, but is not disabled until the system load decreases to the lower setpoint of 40%. In FIG. 3, the system load has increased from a system load of less than 40% to a current system load of 45%, which is still less than the upper power setpoint $P_{SPmax}$. At this system load of less than 50%, the system load 5 is more efficiently powered by using a single power supply 100, rather than to share the system load between the two power supplies 100, 200. The upper and lower power setpoints will be selected based on the operating characteristics of the system to be powered and the particular efficiency of the power supplies being used.

A service processor, which in this embodiment is a baseboard management controller (BMC) 12, communicates with the power supplies via a serial bus 20. The service processor/BMC 12 is a component on the server motherboard, and operates off of standby voltages. The BMC typically incorporates the power management functions for the servers, but some server designs actually have a separate power management microcontroller, which is also part of the system motherboard. The serial bus may be, for example, an I2C (Inter-Integrated Circuit), SMBus (System Management Bus), or PMBus (Power management Bus, a variant of SMBus) generally known in the art. Each power supply 100, 200 has a unique logic address to distinguish which unit the BMC 12 is communicating with. An 8-bit or 16-bit input/output (I/O) port expander 22 is optionally used for communication of power supply status and control. The I/O port expander 22 can optionally be emulated by a microcontroller, which is the preferred implementation used by the power supply manufacturers. One of the I/O port bits included with the port expander/microcontroller 22 is a power mode bit (PMB) 23. The BMC has the capability to write a logic low to the PMB 23 to place the power supply 200 in the reduced power mode. A similar logic bit is included to alternatively place the power supply 100 in a reduced power mode.

The amount of power being drawn by the system load 5 is the determining factor as to whether the power supply 200 should be operated in the higher power mode or, alternatively, the reduced power mode. A current share signal implementation can be used as a measure of the output power, but may not have sufficient accuracy for the desired level of control. Many commercially-available servers have built in power metering, either through a power supply, or on system circuit card assemblies. In this embodiment, a power meter 130 is optionally included with the power supply 100 and a power meter 230 is optionally included with the power supply 200, for determining the present power output of each of the power meters. The power measured by the power meters 130, 230 provides continuous feedback to the BMC 12 for selecting the voltage setting(s) of the power supplies 100, 200.

The BMC 12 issues a command to put the power supply 200 into its reduced power mode when the total power drawn by the system load 5, which is equal to the sum of the power supplied by the primary power supply 100 and the power supplied by the secondary power supply 200, falls from a value above the higher setpoint $P_{SPmax}$ to a value below the lower setpoint $P_{SPmin}$. A first action of the power supply 200 in response to the command bit from the BMC 12 is to reduce its output voltage (i.e. voltage margining to a lower level). The exact value of the lower voltage is not critical; here, the power supply 200 sets its output voltage lower by, for example, approximately 50 mV.

Figure 4:
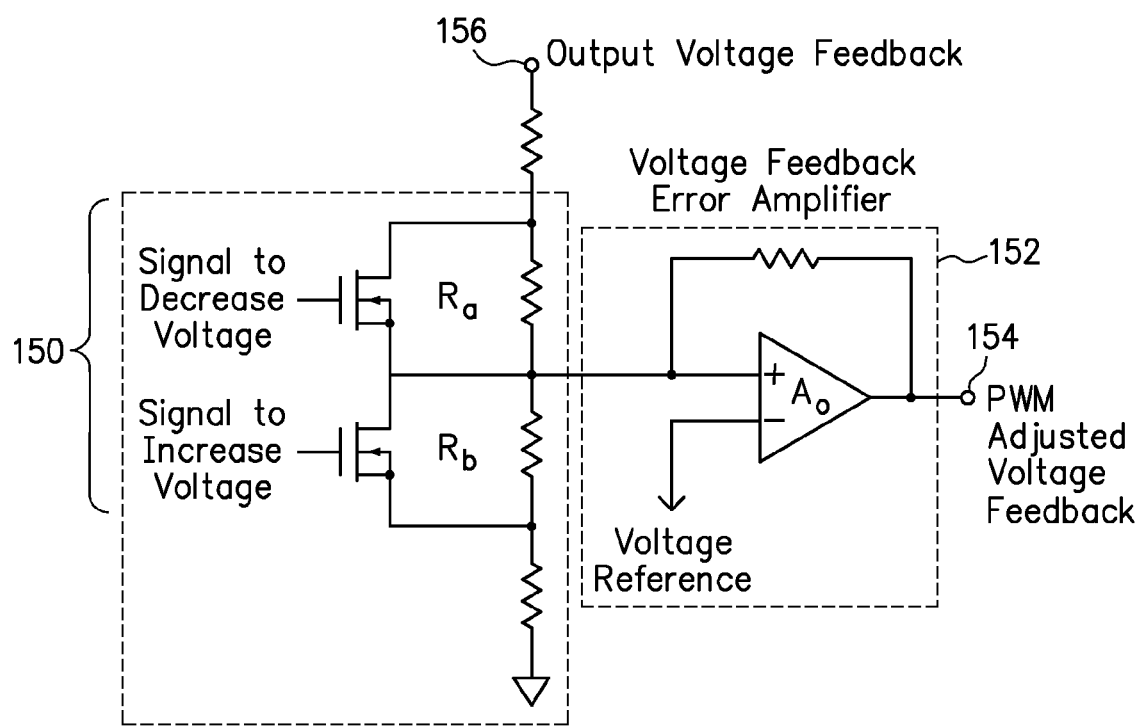
FIG. 4 is a circuit diagram of an example voltage feedback loop modification providing voltage margining to the power supply system of FIG. 3.

The circuits used to accomplish voltage margining of a power supply generally involve adjusting the voltage feedback control loop of the power supply, but can be dependent on the control method used by the power supply vendor and are widely known to those skilled in the art. These methods are normally implemented in a power supply to be used in testing and qualification of the unit in a system and not utilized during normal operating conditions. FIG. 4 is a schematic diagram of an example of a voltage feedback loop modification circuit providing this voltage margining to the DC to DC stage 120 or 220 of the FIG. 3 power supply system. Referring also to FIG. 4, the signal and margining components to reduce the output voltage of one power supply (or alternately to increase the output voltage of the other power supply) is indicated at 150. A voltage feedback error amplifier 152 provides an adjusted voltage feedback signal 154 for the PWM voltage compensation of PWM 122 or 222. A PWM may be selected that already includes the voltage feedback error amplifier 152 to apply the margining components to. Alternatively, the voltage feedback error amplifier 152 may be provided as a separate circuit that is inserted into the feedback loop to adjust the input to the PWM voltage feedback signal of the PWM 122 or 222. An output voltage feedback signal 156 is provided from the 12 Vdc output of the same power supply as the PWM receiving the voltage feedback adjustment if the outputs of each supply are kept isolated, or from a common 12 Vdc voltage feedback for power supplies with outputs connected together.

Referring again to FIG. 3, a second action of the power supply in response to the command bit from the BMC 12 is to disable the internal current share circuitry of the secondary power supply 200. On some power supply designs, such as a power supply using an Analog Devices ADM1041, disabling the internal current share circuitry can be accomplished by grounding the current share sense line 16 via a logic level FET to disable this feature. This approach is useful for 1+1 redundancy, but when more than one power supply is operating, the power supply being put into active standby must not prevent the current share signal from working. A discrete design using comparators could use a logic FET to bias one of its inputs to disable the comparator output. Other methods to disable the current share circuit are not excluded, such as to open circuit the current share control line of the secondary power supply.

The BMC 12 has utilized the output voltage adjustment capabilities inherent in a voltage feedback or current sharing circuit 14 to place the secondary power supply 200 in a mode where it is sourcing no current to the system load 5. While in this reduced power mode, the output of the DC to DC Stage 220 of the secondary power supply 200 has a lower output voltage than the DC to DC Stage 120 of the secondary power supply 100, and is therefore reversed biased by the higher voltage of the primary power supply that is present at the output. In this reduced power mode of operation, the second (DC to DC) Stage 220 of the secondary power supply 200 will have little, to no, switching losses. Inhibiting the PWM controller further, as proposed, will further reduce power losses. The first (PFC) boost Stage 210 of the power supply 200 will also be delivering very little power and active switching losses will be low.

Figure 6:
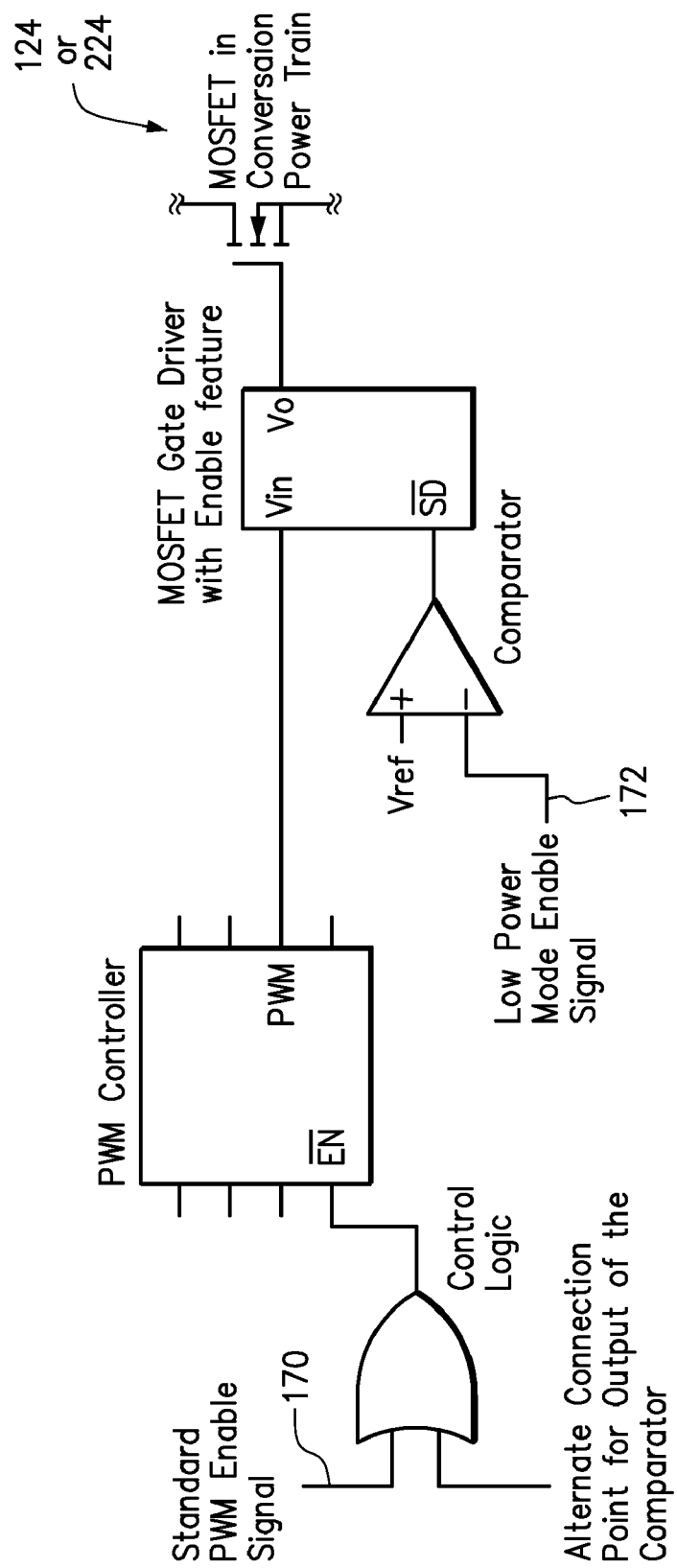
FIG. 6 is a circuit diagram of an example control circuit used to disable or block the PWM waveform from the MOSFETs.

An example of a control circuit used to disable or block the PWM waveform from the MOSFETs, rather than simply modifying the duty cycle of the waveform is shown by way of example in FIG. 6. Unlike the voltage feedback loop modification circuit of FIG. 4, which is typically included only with a DC to DC stage, the circuit of FIG. 6 could be provided with either an AC to DC stage or a DC to DC stage. With reference to the embodiment of FIG. 3, for example, the control circuit of FIG. 6 may be used to disable or block the PWM waveform from reaching the MOSFETs 124 or 224 of the DC to DC stages 120 or 220. Additionally, the control circuit of FIG. 6 may be used to disable or block the PWM waveform from reaching the MOSFETs 114 or 214 of one of the AC to DC stages 110 or 210. The PWM to the power conversion stage MOSFETs may be disabled either through disabling the PWM converter controlling the power conversion stage, or by instead disabling an optional MOSFET gate drive (FIG. 6). A low power mode enable signal 172 is preferred if a gate drive is included. Alternatively, a standard PWM enable signal 170 is preferred in the case that a gate drive is not included. Either signal 170, 172 may be provided according to the logic bit written to the PMB 23 of the I/O port expander or microcontroller by the BMC to place the power supply 200 (or, alternatively, the power supply 100) in the reduced power mode, as discussed above.

Referring again to FIG. 5, The PWM controller 212 of the boost Stage 210 and the PWM controller 222 of the DC to DC stage are disabled from switching the MOSFETs 214, 224 on and off. Because there is a two stage conversion process in the power supply 200, both stages 210, 220 are controlled to disable switching, while remaining in a state to re-enable the switching. To accomplish this aspect of the power control, the comparator circuit may need to periodically re-enable PWM switching by the PWM controllers 212, 222 to keep the power supply 200 in a ready state to take over supplying current in the event of the failure of the other power supply 100 in the system. For the boost front end, this can be accomplished, for example, by monitoring the boost voltage and enabling the boost PWM if the intermediate 400 Vdc bus voltage decays/ drifts down below a predetermined set point (a 10 volt drop for example). For the DC/DC power section of the secondary power supply 200, the comparator thresholds disabling the PWM can be set to enable the circuit if the voltage difference between the output voltage lower setpoint and the voltage feedback from the output bus (the voltage of the operating power supplies) is, for example, less than half of the set point differential (25 mV in this example). With the MOSFETs 214, 224 disabled, no energy is transferred to the output of the power supply 200, which avoids any significant power dissipation and results in power savings. The typical zero load losses of a sample power supply that this invention was tested on measured 45 Watts. The no load losses of the same power supply in a reversed biased operating mode is 8 Watts and represents a significant efficiency gain for a system.

The reduced power mode of the power supply 200 does not actively put the power supply 200 into a standby mode or turn off the power supply 200. As explained above, the power supply 200 remains on and regulating, just to a lower voltage. The power supply 200 is thereby operating in a mode that consumes less power, giving the advantage of a quasi-standby operation. The power supply 200 does not need to be brought back from a standby or powered-off state in order to deliver power after a fault of the other power supply 100. Moreover, if the power supply 100 were to fail while delivering all the current to the system load 5, the output voltage of the power supply 100 would drop. In response, the secondary power supply 200 would automatically pick up the output current load once the voltage of the power supply 100 has dropped down to the slightly lower voltage set point of the secondary power supply 100.

Figure 5:
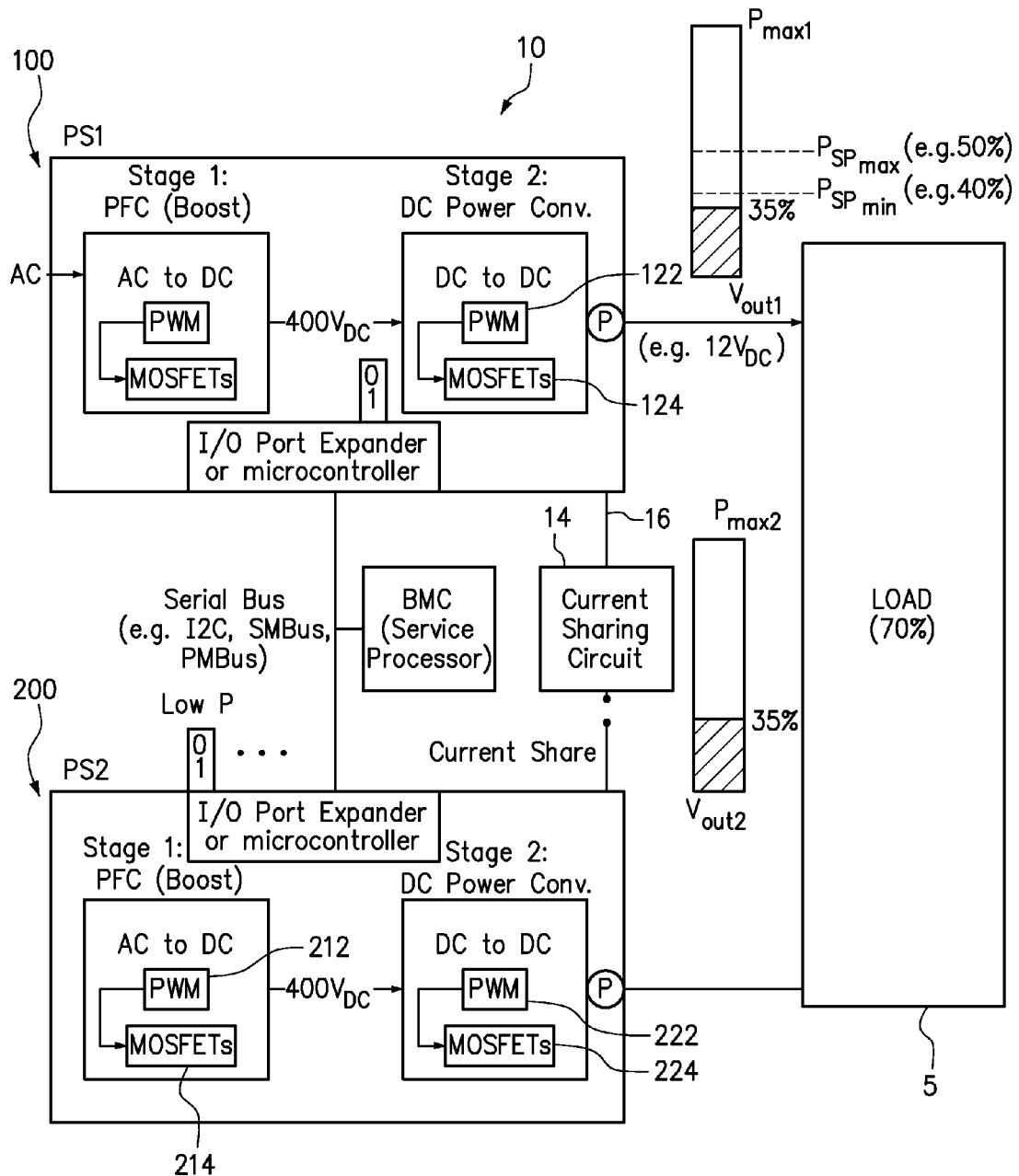
FIG. 5 is a block diagram of the redundant power supply system of FIG. 3 with the two redundant power supplies operating in a normal shared current mode.

FIG. 5 is a block diagram of the redundant power supply system 10 with the redundant power supplies operating in a normal shared current mode. The system load 5 has reached the power setpoint, which is about 70% of the maximum power output of either one of the power supplies 100, 200. The current share signal line 16 between the redundant power supplies 100, 200 will be monitored by the current sharing circuit 14, and when the upper power setpoint $P_{SPmax}$ (50% in this example) was reached, the power supplies 100, 200 resumed normal current sharing operation, sharing the 70% load at 35% each. The PWM waveforms generated by the PWM controllers 212, 222 are unblocked, so that the MOSFETs are again switched on and off according to the duty cycle of the PWM waveform. The PWM controllers 112, 122 of the first power supply 100 and the PWM controllers 212, 222 may adjust the respective duty cycles to supply a balanced power output of approximately 35% per power supply 100, 200. Because the reduced power mode of operation of FIG. 3 was accomplished without turning off the power supply 200 or placing the power supply 200 in a standby mode, the power supply 200 may more reliably and quickly resume a shared mode of operation to equally share the system load 5 with the power supply 100 in response to the system load 5 reaching the power setpoint.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of providing redundant power to a system load, comprising:
   converting alternating current to direct current in each of a first and second power supply;
   generating a pulse width modulation waveform to control the power output of each power supply;
   supplying the direct current from each of the first and second power supplies to the system load in parallel when the system load is in an upper power consumption range; and
   adjusting the output voltage of the first power supply higher or the voltage of the second power supply lower and disabling or blocking the pulse width modulation waveform in the second power supply in response to the adjusted output voltage to power the system load entirely with the first power supply when the system load is in a lower power consumption range.

2. The method of claim 1, further comprising:
switching the second power supply to a reduced power mode in which the pulse width modulation waveform in the second power supply is disabled or blocked in response to the system load decreasing to a value below a lower setpoint.

3. The method of claim 2, further comprising:
switching the second power supply to an upper power mode in which the pulse width modulation waveform in the second power supply is re-enabled or unblocked in response to the system load increasing to a value above an upper setpoint, wherein the upper setpoint has a value greater than the lower setpoint.

4. The method of claim 1, further comprising:
transferring no energy to the output of the second power supply while disabling or blocking the pulse width modulation waveform in the second power supply.

5. The method of claim 1, further comprising:
reverse biasing the second power supply in response to system load being below a power setpoint.

6. The method of claim 1, wherein the step of converting alternating current to direct current further comprises:
converting the alternating current to direct current having a first DC voltage; and
converting the first DC voltage to a second DC voltage and outputting the second DC voltage of the system load.

7. The method of claim 1, wherein the step of reverse biasing the second power supply comprises:
generating a command bit to reduce the output voltage of the second power supply or to increase the output voltage of the first power supply.

8. The method of claim 1, further comprising:
in response to the system load reaching the power setpoint, supplying the direct current from each of the first and second power supplies to the system load in equal amounts.

9. The method of claim 1, further comprising:
periodically re-enabling the pulse width modulation switching to maintain the power supply in the ready state.

10. A redundant power system, comprising:
a first power supply and a second power supply coupled to a system load in parallel, each power supply including a pulse width modulation generator;
a power meter for sensing a system power consumption;
a service processor for monitoring the power consumption and generating a reduced power mode command bit to the second power supply in response to the power consumption being below a power setpoint; and
a controller for blocking the pulse width modulation waveform in the second power supply in response to the reduced power mode command bit.

11. The redundant power system of claim 10, further comprising:
a serial bus providing communication between the service processor and the second power supply.

12. The redundant power system of claim 11, wherein the serial bus includes an I2C bus, an SMBus, or a PMBus.

13. The redundant power system of claim 10, further comprising:
a serial bus input/output port expander including a register for registering the reduced power mode command bit.

14. The redundant power system of claim 10, further comprising:
a microcontroller emulating an input/output port expander, including a register for registering the reduced power mode command bit.

15. The redundant power system of claim 10, further comprising:
a DC to DC conversion stage in the second power supply;
wherein the controller for blocking the pulse width modulation waveform in the second power supply includes a comparator circuit configured to disable or block the PWM waveform from one or more field effect transistors (FETs) in the DC to DC conversion stage of the second power supply without modifying the duty cycle of the waveform.

16. The redundant power system of claim 10, wherein the controller for blocking the pulse width modulation waveform in the second power supply comprises:
a microcontroller configured to generate a signal to selectively enable and block the PWM waveform.

17. A redundant power system, comprising:
a first power supply and a second power supply coupled to a system load in parallel, each power supply including a pulse width modulation generator, and at least the second power supply including a DC to DC conversion stage;
a power meter for sensing a system power consumption;
a service processor for monitoring the power consumption and generating a reduced power mode command bit to the second power supply in response to the power consumption being below a power setpoint; and
a controller including a comparator circuit configured to disable or block the PWM waveform from one or more field effect transistors (FETs) in the DC to DC conversion stage of the second power supply in response to the reduced power mode command bit without modifying the duty cycle of the waveform.

* * * * *